United States Patent

[11] 3,591,200

| [72] | Inventor | Frederick F. Van Raden<br>Hillsboro, Oreg. |
|---|---|---|
| [21] | Appl. No | 819,138 |
| [22] | Filed | Apr. 25, 1969 |
| [45] | Patented | July 6, 1971 |
| [73] | Assignee | Peerless Trailer and Truck Service, Inc.<br>Tualatin, Oreg. |

[54] COMPENSATOR HEAD FOR LOGGING TRAILERS
3 Claims, 5 Drawing Figs.

[52] U.S. Cl. .................................................. 280/142, 280/404
[51] Int. Cl. ...................................................... B62d 53/00
[50] Field of Search .......................................... 280/142, 404, 478, 482

[56] References Cited
UNITED STATES PATENTS

| 1,923,904 | 8/1933 | Allen et al. | 280/482 |
| 1,953,052 | 3/1934 | Linn | 280/482 |
| 2,174,063 | 9/1939 | Richards | 280/482 |
| 2,520,776 | 8/1950 | Page | 280/404 |
| 2,716,560 | 8/1955 | Clipfell | 280/142 |
| 3,181,881 | 5/1965 | Van Raden | 280/142 |

FOREIGN PATENTS
230,658 12/1963 Austria ............... 280/482

*Primary Examiner*—Leo Friaglia
*Attorney*—Buckhorn, Blore, Klarquist and Sparkman ABSTRACT: A compensator for achieving longitudinal adjustments in the coupling between a logging truck and the reach of a logging trailer, having a housing attached to the reach and an eye-carrying member reciprocable within an opening in said housing for attachment to the truck. A latch is mounted on the housing retractably to obstruct movement of the reciprocable member within the opening in the housing. A latch-receiving slot is disposed on the reciprocable member intermediate its fully extended and fully retracted positions. The reciprocable member is of constant diameter on both sides of the latch-receiving slot. A cam rod transversely disposed within said housing selectively urges the latch against the constant diameter portion of the reciprocable member, whereby movement of the latter with respect to the housing causes the latch to snap into the latch-receiving portion. The coupling may thus achieve both longitudinal extension and contraction from an initial position determined by the engagement of the latch within the latch-receiving portion of the reciprocable member.

FREDERICK F. Van RADEN
INVENTOR

BY
BUCKHORN, BLORE, KLARQUIST & SPARKMAN
ATTORNEYS

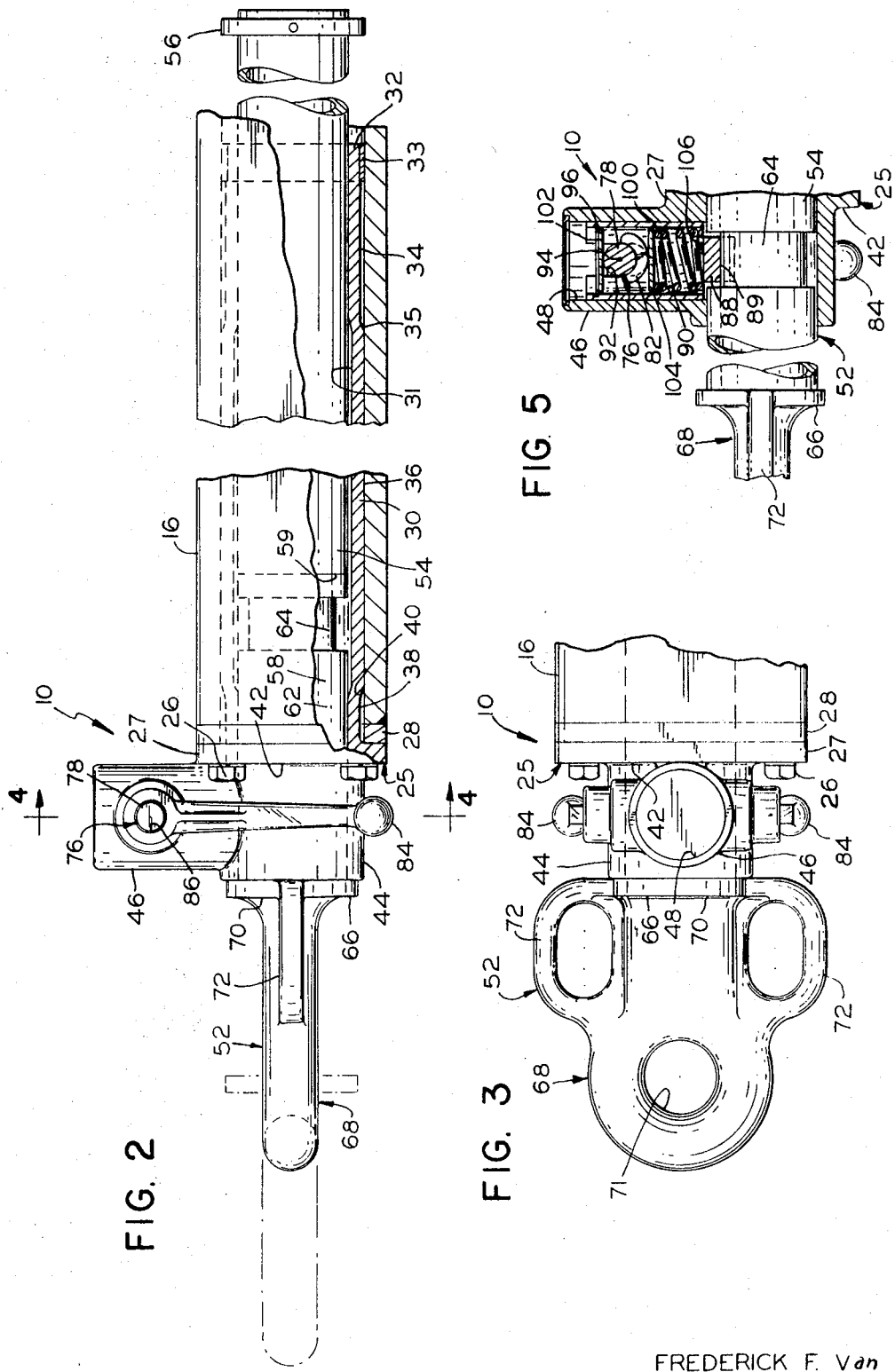

3,591,200

COMPENSATOR HEAD FOR LOGGING TRAILERS

BACKGROUND OF THE INVENTION

This invention relates to logging trailers and, more particularly, to a compensator head for making longitudinal adjustments in the coupling between the hitch on a logging truck and the reach of a logging trailer as operation of the coupled truck and trailer may require.

A logging trailer is attached to a logging truck by a coupling between the reach on the trailer and a hitch on the truck. The logs are carried in bunks, one of which is mounted on the truck and the other one on the trailer. With logs positioned in the bunks, longitudinal movement between the bunks is not possible. Thus, when the truck and trailer are loaded and underway and, for example, rounding a curve, an extension in length between the hitch and the reach is necessary. This has heretofore been achieved by installing a length compensating device in the coupling, which device is known as a compensator head. Also, since highway laws impose certain maximum load limits, trucks and trailers are provided with built-in scales on the bunks. Any tilting of the bunks will cause a false reading of the scales. Thus, it is desired that a shortening of the reach be permitted so as not to tilt the bunks after loading in the event the trailer and truck are not perfectly aligned at the time of loading.

The compensator heads that have been known heretofore have comprised an elongated member adapted to slide in and out of a housing in the trailer reach to achieve the necessary adjustments in length. In order to permit the compensator head to effect a certain amount of contraction in the coupling required by the fact that the truck and trailer may not be perfectly aligned when the logs are loaded in the bunks, a pin has been provided to lock the elongated member and housing together. Receiving holes have been provided in both the member and the housing to receive the pin, and the holes have been so positioned that when the pin is removed, the coupling has been in a position to achieve both extensions and contractions in length. This prior construction, however, has required that the driver jockey the truck with respect to the trailer to align the holes in the member and housing so that an assistant can insert the pin. Such has proven to be a time-consuming operation and has also placed the assistant in a dangerous position.

Accordingly, it is the primary object of the present invention to provide an improved compensator head for the coupling between the reach of a logging trailer and the hitch on a logging truck, which compensator head will achieve both the necessary extensions and contractions in the coupling but will eliminate the necessity to jockey the truck and trailer to permit a pin to be placed in the member and the reach before the logs can be placed into the bunks.

SUMMARY OF THE INVENTION

The compensator head of the present invention comprises an elongated member and means mounting the member within the forward end of the reach for longitudinal sliding movement relative to the reach, the elongated member being adapted to slide in and out thereof.

Releasable latch means are provided for securing the elongated member in a partially extended position relative to the reach. Such comprise a latch mounted on the reach, means to urge the latch toward the elongated member, and latch engaging means on the latter to engage the latch in a predetermined partially extended position of the elongated member. Means for disengaging the latch from the elongated member are also provided.

The reciprocable elongated member is of constant external diameter on both sides of the latch-engaging portion thereon. The truck thus needs only be moved slightly toward or away from the trailer to effect engagement of the latch when the latter is in position to be locked in place, and no additional man is required on the spot to effect the connection.

When the latch is received in the latch-engaging means on the elongated member, a positive connection is achieved between that member and the reach, thus permitting tension to be exerted by the hitch on the reach. Insertion of the latch means within the latch-engaging portion permits the logging truck to pull the logging trailer even though no logs are carried thereby.

When the latch is raised out of engagement with the latch receiving portion in the elongated member, the latter is disposed within an opening in the housing in the reach in a position such that an amount of relative contraction in the coupling is possible. Contraction in the coupling between the reach and the hitch on the truck may thus be achieved even though the logs on the bunks render the longitudinal distance between them absolutely fixed.

BRIEF DESCRIPTION OF THE DRAWINGS

FIG. 2 is a side elevational view partly in section and to an enlarged scale of the compensator head of the present invention, showing extension of the eye-carrying member in phantom.

FIG. 3 is a plan view of a portion of the structure of FIG. 2.

FIG. 5 is a sectional view taken on line 5-5 of FIG. 4, but drawn to the scale of FIGS. 2 and 3.

DESCRIPTION OF THE PREFERRED EMBODIMENT

Figure 1:
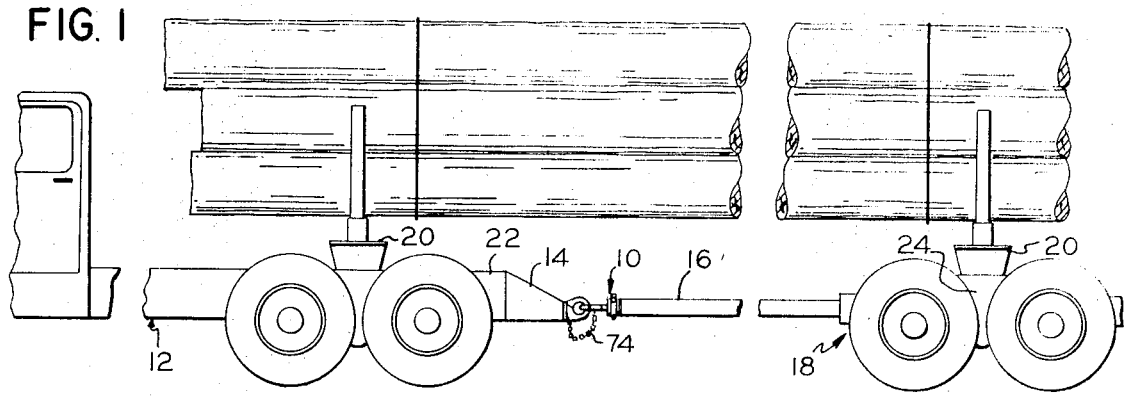
FIG. 1 is a side elevational view of a truck and trailer, in the coupling between which a compensator head according to the present invention is installed.

Referring now in detail to the drawings, the compensator head 10 of the invention is shown installed between a truck 12 having a hitch 14 extending from the back thereof and the reach 16 on a logging trailer 18. Logs are carried in the customary manner within bunks 20 mounted on frames 22, 24, one each positioned on truck 12 and trailer 18.

Compensator head 10 comprises a compensator housing 25 which is received within reach 16, being bolted thereto by bolts 26 which join a flange 27 on housing 25 to a mating flange 28 on the end of reach 16.

Housing 25 comprises a hollow generally cylindrical member 30 which is received in reach 16. Member 30 itself comprises six sections through which a longitudinally extending cylindrical opening 31 passes. There is a first section 32 between which section and reach 16 a bushing 33 is positioned, a second section 34 having a larger external diameter than section 32 but the same internal diameter as section 32, a transition section 35 between section 34 and a section 36 having both internal and external diameters larger than those of section 34, and a necked down section 38 joined to section 36 by another transition section 40. Section 38 terminates in flange 27 which is bolted to reach 16 as aforementioned.

On the external side 42 of flange 27 is a head 44 through which cylindrical opening 31 also passes. Head 44 comprises a generally T-shaped upper portion 46 having a vertically extending cylindrical opening 48 and a transversely extending cylindrical opening 50 passing therethrough.

An eye-carrying tubular member 52 is slidably received in housing 25. Member 52 comprises a cylindrical portion 54 terminating in a collar 56. Portion 54 fits into opening 31 in housing 25 being supported by sections 32, 34 and 38 thereof and is prevented from being withdrawn completely by collar 56 which, after tubular member 52 is completely extended, bottoms against section 32 of the housing. The movement of portion 54 within housing 25 provides the necessary extension in the coupling between hitch 14 and reach 16.

Figure 4:
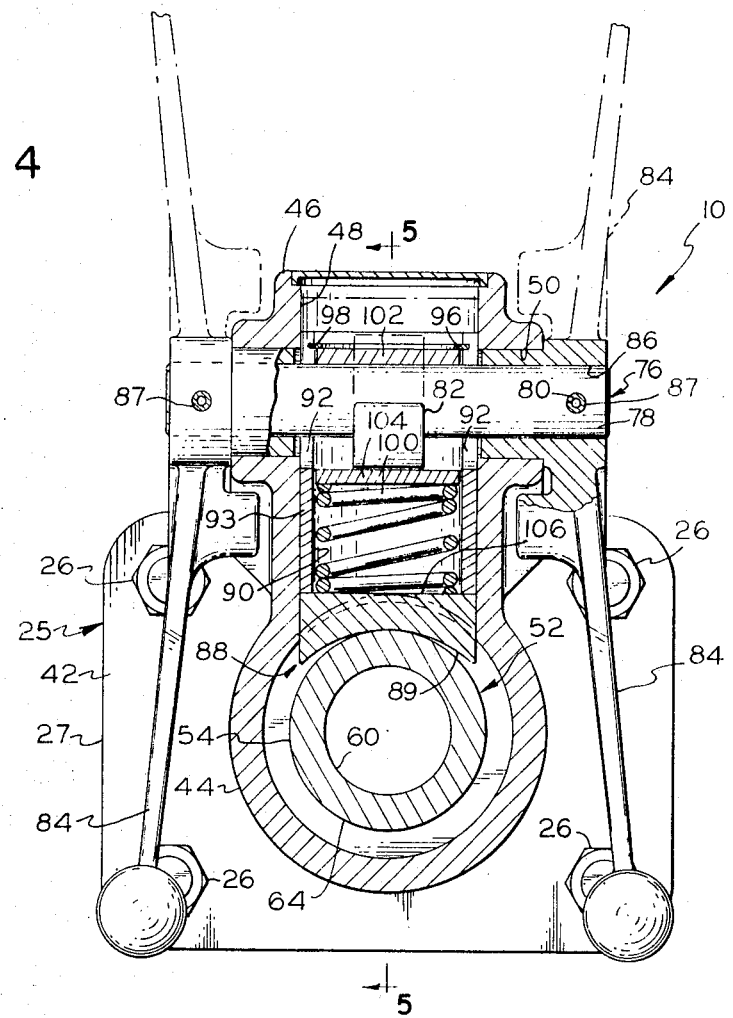
FIG. 4 is a sectional view to an enlarged scale taken on line 4-4 of FIG. 2 and showing the latch within the latch-engaging portion on the elongated reciprocable member.

A latch-receiving portion 58 is welded to the exterior side 59 of cylindrical portion 54 of member 52. Portion 58 has a cylindrical opening 60 therein (see FIG. 4) and comprises a section 62 having an external diameter equal to that of portion 54 and a cylindrical latch-receiving section 64 of lesser diameter. Section 62 terminates in a collar 66 which limits the amount of penetration of tubular member 52 into housing 25. An eye-carrying section 68 extends from the exterior side 70 of collar 66 and comprises an eye 71 for attachment to hitch 14 and a second pair of eyes 72 to which safety chains 74 are attached.

A cam rod 76 is received in transversely extending opening 50 in head 44 of housing 25. Cam 76 has a cylindrical body portion 78 provided with a drilled hole 80 in each end thereof and a cam surface 82 mounted on the center of portion 78. An actuating handle 84 having a cylindrical opening 86 fits over each end of portion 78 of cam 76, being retained by rollpins 87.

A latch 88 is received in vertically extending opening 48 in head 44. Latch 88 is generally cylindrically shaped and has a lower concavely curved portion 89 for engagement with portion 58 and section 64 of member 52. Latch 88 also has a vertically extending cylindrical opening 90 therewithin. Two U-shaped slots 92 are cut in its walls 93 and centered on its transverse axis 94. Cam 76 is received within slots 92 for vertical actuation of the latch.

A snapring 96 is received in an annular slot 98 near the top of opening 90. A helical spring 100 is disposed within opening 90 below cam 76. A washer 102 is disposed between snapring 96 and the upper surface of cam 76, and a similar washer 104 is disposed between the upper surface of spring 100 and cam surface 82.

Rotation of handles 84 downwardly causes cam surface 82 to exert downward pressure on spring 100 through washer 104, thereby to compress the spring against the upper surface 106 of curved portion 89 of latch 88. Such tend to force latch 88 downwardly against either portion 54 or section 62 which are of constant external diameter. When member 52 is moved longitudinally with respect to housing 25, portion 89 rides along the upper surface of either portion 54 or section 62 and snaps into latch-receiving section 64.

Rotation of handles 84 upwardly causes cam surface 82 to exert upward pressure on washer 102 and snap ring 96, thereby to lift latch 88 out of engagement with section 64 and free member 52 for movement within housing 25.

OPERATION

The compensator head of the present invention functions as follows. When the truck 12 and trailer 18 are coupled together ready to be loaded with logs, actuating handles 84 are rotated downwardly to compress spring 100. Movement of the truck with respect to the trailer will then cause latch 88 to snap into latch-receiving section 64. Member 52 is then in the position shown in phantom in FIG. 2, and ordinarily it will be in this position when the trailer is coupled to the truck after returning to the loading site. The truck and trailer are then aligned as closely as possible, and the logs are loaded into the bunks.

Handles 84 are then rotated upwardly to lift latch 88 out of engagement with section 64, thus freeing member 52 for movement within housing 25. As truck 12 and trailer 18 get underway, if hitch 14 and reach 16 are not perfectly aligned, either horizontally or vertically, a certain amount of contraction will result in the coupling. Since latch 88 is disengaged from section 64, member 52 can slide into housing 25 an amount limited only by the length of section 62, thereby to provide the necessary contraction in the coupling and avoid the possibility of any longitudinal force being applied by the logs to the bunks so as not to affect the bunk scales. Constructing section 62 approximately 7 inches long will provide the necessary contraction.

As truck 12 and trailer 18 travel over the road with logs strapped to bunks 20, a certain amount of longitudinal extension is required in the coupling between hitch 14 and reach 16. Such will occur in the horizontal plane when the truck and trailer negotiate a curve and will occur in the vertical plane when the road is not perfectly horizontal. Since latch 88 is out of engagement with section 64, this required extension can be achieved by member 52 being withdrawn from housing 25. Member 52 can be withdrawn from housing 25 a distance equal to the length of portion 54 before collar 56 bottoms against section 32 of the housing. Making portion 54 6 feet long will normally provide an adequate amount of longitudinal extension.

After the truck and trailer have reached the unloading site and the logs have been removed from the bunks 20, handles 84 are rotated downwardly to spring load latch 88 against the member 52. If the latch 88 is not engaged in latch engaging section 64, the driver needs only to move the truck either forward or backward with respect to the trailer automatically to engage latch 88 into section 64, thereby to effect a rigid connection between member 52 and housing 25 (See FIG. 4). Truck 12 can then pull trailer 18 by means of coupling between hitch 14 and reach 16. The thus coupled truck and trailer can be driven until they reach the site at which trailer 18 can be disengaged from the truck, hoisted up on it and carried back to the log loading site.

In the foregoing description the invention has been described with reference to a certain particular preferred embodiment, although it is to be understood that the specific details shown are merely illustrative and that the invention may be carried out in other ways without departing from the true spirit and scope of the following appended claims.

I claim:

1. A compensator head for a trailer reach comprising,
   an elongated member;
   means mounting said elongated member within the forward end of a trailer reach for longitudinal sliding movement relative to said reach, said elongated member being extensible from said reach;
   latch-engaging means on said elongated member for securing the same in a predetermined partially extended position with respect to said reach;
   a latch mounted on said reach for securing said elongated member in said predetermined partially extended position, said latch comprising
   a generally cylindrical member,
   a vertically extending cylindrical opening in said cylindrical member,
   a lower portion on said cylindrical member to engage said latch-engaging means on said elongated member,
   a slot cut in each side of said cylindrical member, said slots being centered on the transverse axis of said cylindrical member,
   a spring disposed within said vertically extending cylindrical opening in said cylindrical member and adapted to exert pressure on said lower portion thereof,
   a transversely extending cam rod disposed within said cylindrical member and passing through said side slots therein,
   a cam surface on said cam rod and adapted to exert pressure on the upper surface of said spring, whereby rotation of said cam rod causes said cam surface to compress said spring against said lower portion of said cylindrical member to force said cylindrical member downwardly toward said elongated member, and
   means for disengaging said latch from said latch-engaging means.

2. The compensator head of claim 1 in which said lower portion of said cylindrical member is curved concavely upward to ride along the upper surface of said elongated member and when said spring is compressed, to snap into said latch-engaging means on said elongated member.

3. The compensator head of claim 1 further comprising an annular slot formed in said cylindrical member adjacent the top of said opening therein, a snap ring disposed in said slot, and a washer disposed between said snap ring and the upper surface of said cam rod, whereby counterrotation of said cam rod causes said cam surface to exert upward pressure on said washer and said snap ring and lift said cylindrical member out of engagement with said elongated member.